(12) United States Patent
Hartmann et al.

(10) Patent No.: US 6,851,062 B2
(45) Date of Patent: Feb. 1, 2005

(54) SYSTEM AND METHOD FOR MANAGING DENIAL OF SERVICE ATTACKS

(75) Inventors: Richard G. Hartmann, Endicott, NY (US); Daniel L. Krissell, Hallstead, PA (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 436 days.

(21) Appl. No.: 09/965,074

(22) Filed: Sep. 27, 2001

(65) Prior Publication Data

US 2003/0061510 A1 Mar. 27, 2003

(51) Int. Cl.[7] .............................................. G06F 11/30
(52) U.S. Cl. ...................... 713/201; 713/200; 709/206; 709/225; 709/226; 709/227; 709/228; 709/207
(58) Field of Search ................................ 713/200, 201, 713/153; 709/206, 207, 228, 227, 229, 226, 225; 380/287

(56) References Cited

U.S. PATENT DOCUMENTS

| | | | |
|---|---|---|---|
| 5,826,014 A | * 10/1998 | Coley et al. ................. 713/201 |
| 5,832,228 A | 11/1998 | Holden et al. ......... 395/200.55 |
| 5,898,830 A | 4/1999 | Wesinger, Jr. et al. .. 395/187.01 |
| 6,061,798 A | 5/2000 | Coley et al. ................. 713/201 |
| 6,065,118 A | 5/2000 | Bull et al. ................... 713/200 |
| 6,092,197 A | 7/2000 | Coueignoux ................ 713/200 |
| 6,185,689 B1 | 2/2001 | Todd, Sr. et al. ........... 713/201 |
| 6,389,532 B1 | * 5/2002 | Gupta et al. ................ 713/163 |
| 6,476,833 B1 | * 11/2002 | Moshfeghi ................... 345/854 |
| 6,513,122 B1 | * 1/2003 | Magdych et al. ........... 713/201 |
| 6,606,659 B1 | * 8/2003 | Hegli et al. ................. 709/225 |
| 6,658,565 B1 | * 12/2003 | Gupta et al. ................ 713/153 |
| 2002/0046223 A1 | 4/2002 | Lamberton et al. ......... 707/513 |

FOREIGN PATENT DOCUMENTS

WO            99/48303           3/1999

OTHER PUBLICATIONS

*Discouraging Penetration Attempts on Interactive Computer Systems without Denial–Of–Service*, IBM Technical Disclosure Bulletin, vol. 31,No. 9, Feb. 1989, pp. 147–149.
*A Strong Client–Server Mutual Authentication Scheme*, Research Disclousre No. 41787, Jan. 1999, p. 129.
*Method for Increasing Security in Tamper Resisstant PKCS11 Tokens*. Research Disclosure No. 434142, Jun. 1000, p. 1127.

* cited by examiner

*Primary Examiner*—Ly V. Hua
(74) *Attorney, Agent, or Firm*—Shelley M. Beckstrand (57) ABSTRACT

A system and method for monitoring and controlling the total number of SSL port resources that are allowed to be tied up by a malicious or inept client making multiple requests from a single IP address. Smart SSL handshake timeout detection is used to track and deny service to any SSL clients that do denial of service (DOS) attacks.

26 Claims, 5 Drawing Sheets

SYSTEM AND METHOD FOR MANAGING DENIAL OF SERVICE ATTACKS

BACKGROUND OF THE INVENTION

1. Technical Field of the Invention

This invention pertains to managing denial of service (DOS) attacks. More particularly, it relates to denying service to clients issuing more than a configurable number of outstanding (incompleted) negotiation requests.

2. Background Art

For Secure Sockets Layer (SSL) client/server applications, it is often the case that an SSL client will attempt to connect to an SSL server application and request a secure SSL connection. For the SSL application server, it is necessary to authenticate such clients using a common certificate store, which must be accessed any time a new SSL session is established. This certificate store contains certificates for those clients that are authorized to the server system and server applications.

As is typical in SSL application server design, application programming interfaces (APIs) are used to access SSL functions. The following SSL functions define a standard sockets API used in TCP/IP networks.

SSL_CREATE( ) enables SSL support for a specified socket descriptor.

SSL_DESTROY( ) ends SSL support for the specified SSL session.

SSL_HANDSHAKE( ) initaties the SSL handshake protocol.

SSL_INIT( ) initializes the current job for SSL.

SSL_READ( ) receives data from an SSL-enabled socket descriptor.

SSL_WRITE( ) writes data to an SSL-enabled socket descriptor.

Figure 1A:
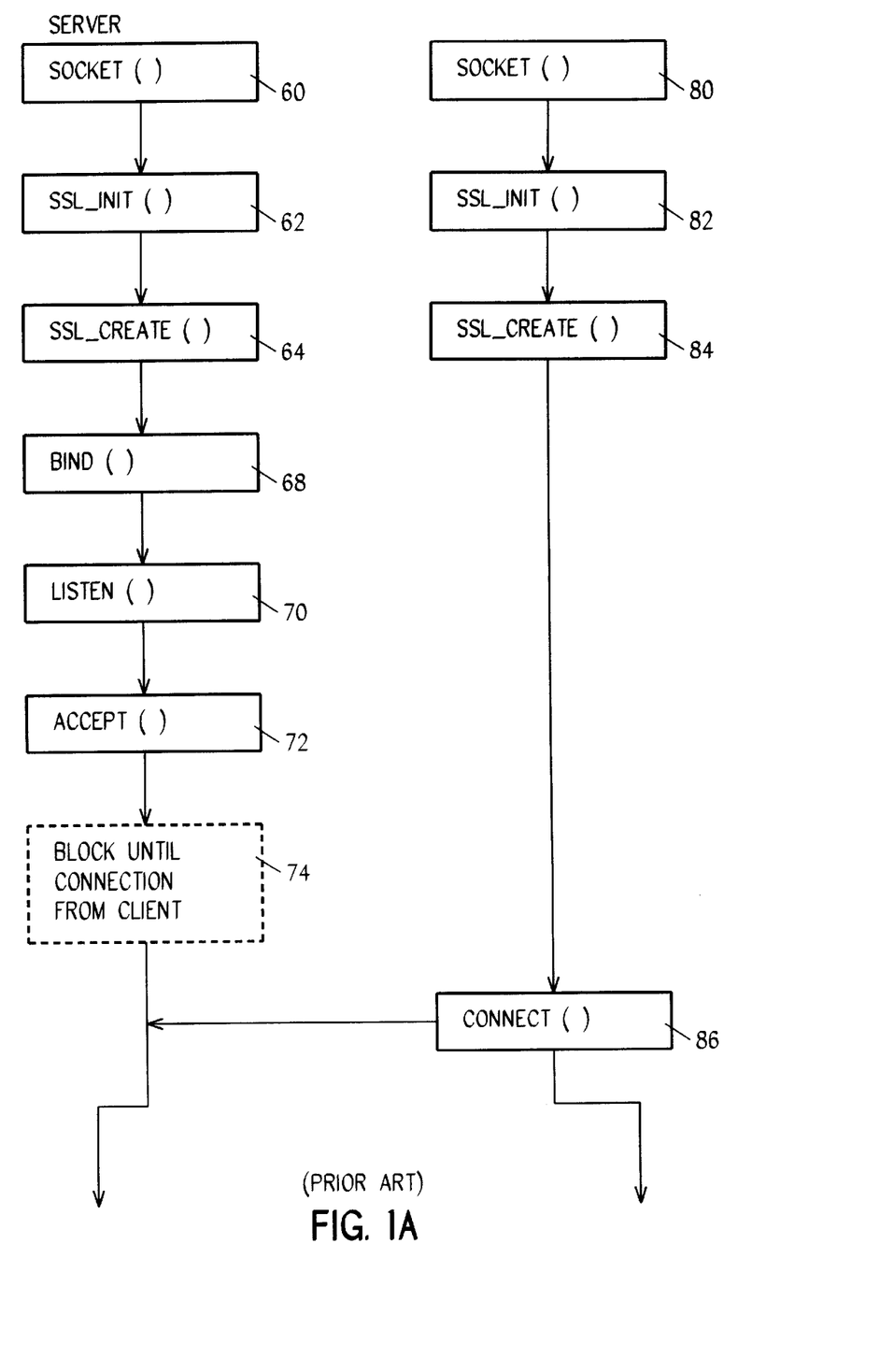
Figure 1B:
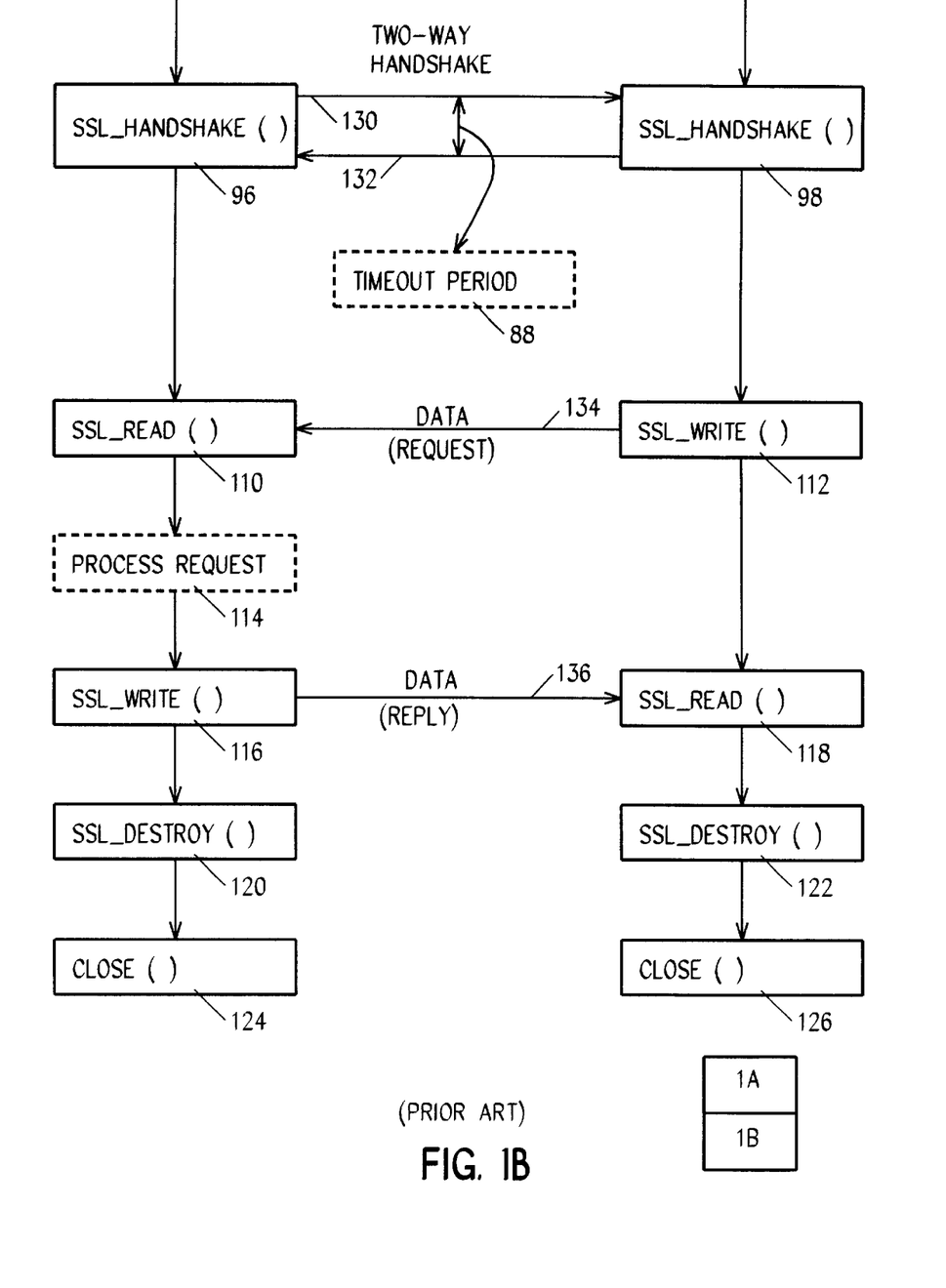

Referring to FIG. 1, a server or client application that uses the sockets and SSL APIs contains the following elements:

1. A call to SOCKET( ) 60 or 80 to obtain a socket descriptor.
2. A call to SSL_INIT( ) 62 or 82 to initialize the job environment for SSL processing. An SSL_INIT( ) call must succeed at least once in a job.
3. A call to SSL_CREATE( ) 64 OR 84 to enable SSL support for the connected socket.
4. Socket calls to activate a connection. The application calls CONNECT( ) 86 to activate a connection for a client program, or it calls BIND( ) 68, LISTEN( ) 70 and ACCEPT( ) 72 to activate a connection for a server program.
5. A call to SSL_HANDSHAKE( ) 96 or 98 to initiate the two way SSL handshake negotiation 130, 132 of the cryptographic parameters. Both a server program and the client programs with which it communicates must provide a certificate for an SSL handshake 130, 132 to succeed. A server must also provide the private key that is associated with its certificate or its key ring file. The SSL_INIT( ) CALL 62 identifies the key ring file from which the certificate and private key are obtained for all SSL sessions established for a job.
6. Calls to SSL_READ( ) 110 and 118 and SSL_WRITE( ) 116 and 112 to receive and send data 134, 136.
7. A call to SSL_DESTROY( ) 120 or 122 to disable SSL support for the socket.
8. A call to CLOSE( ) 124 or 126 to destroy the connected sockets.

A problem can exist in the sequence of calls illustrated in FIG. 1 at two way handshake 130, 132. SSL_HANDSHAKE( ) 96, 98 requires two-way communication between the client and server programs to complete successfully. An SSL client program written by a hacker can be written to not complete the client-side handshake 132, and effectively block the SSL server application hostage—preventing further use of that server. The server is blocked because it is obligated to wait for the client-side handshake 132 before it can continue. This is the well-known Internet style attack called 'denial of service' or DOS. Its effect is that any new SSL clients that attempt to connect to the application server cannot get a connection, because the blocked server never sees their connect request 86. Also poorly written clients can inadvertently cause DOS attacks to occur. Whatever the case, a particular SSL application server is blocked while waiting for a client to properly complete the SSL handshake 132. If the client never responds, the server never continues to process the request 114.

SSL API developers anticipated a server might block on the call to SSL_HANDSHAKE( ) 96, and therefore supply a timeout setting 88. This means an SSL application server can be written to break out of a blocked state with a client in order to continue. This solution is difficult to implement effectively, since if the timeout value 88 is set too large, a DOS attack is effective for the duration of the timeout period 88. On the other hand, if the timeout period 88 is set too short, network delays can make it hard for a valid SSL client to successfully connect.

Single threaded servers are particularly vulnerable to denial of service attacks because total blocking of all processes or functions of the server may be the result.

It is an object of the invention to provide an improved system and method for managing denial of service attacks.

It is a further object of the invention to provide a system and method for reducing the impact of a denial of service attack on server resources.

It is a further object of the invention to provide a system and method for managing denial of service attacks which does not unduly restrict service to legitimate clients.

It is a further object of the invention to deny service to DOS hacker clients and maximize service to legitimate clients.

It is a further object of the invention to provide a system and method for minimizing or eliminating server resources (CPU, storage, etc.) used by malicious clients.

SUMMARY OF THE INVENTION

A system and method is provided for operating a server by maintaining a record of the number of pending service requests from a client; upon receiving a request for service from a client having more than a configurable number of pending service requests, denying service to the client; determining when the number of times that negotiations for a service connection from the client exceed a timeout value; and upon that number exceeding a trigger threshold, denying service to the client.

In accordance with an aspect of the invention, there is provided a computer program product configured to be operable to manage denial of service attacks from a client.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 is a flow diagram illustrating typical SSL client and server call sequences.

FIG. 2 is a flow diagram illustrating the method of the invention for managing DOS attacks.

BEST MODE FOR CARRYING OUT THE INVENTION

In accordance with a preferred embodiment of the invention, a system and method is provided for monitoring and controlling the total number of SSL port resources that are allowed to be tied up by a malicious or inept client making multiple requests from a single IP address.

In a typical implementation there can be many, for example 99, servers listening for new requests from SSL clients and responding by entering into SSL handshake negotiations. At the point when each of the 99 servers are locked up in SSL negotiations the server system is blocked in a denial of service (DOS) scenario. In accordance with this first aspect or embodiment of the invention, a list is maintained of every client by IP address that has an outstanding SSL_HANDSHAKE( ) negotiation in progress, and any new request is denied from any client whose address shows up more than a configurable number of times in the outstanding (that is, incomplete) SSL negotiation list. This client will continue to be denied access until one of the outstanding SSL negotiation requests of that client either completes or times out, the latter to allow for network latency for difference clients. In this way, a single client at a particular IP address can only lock up a small number of the total SSL port resources, and even then only for the duration of the configurable timeout. Alternatively and equivalently, a counter may be maintained for each client address requesting access, which counter is incremented with each new request and decremented with each successful handshake completion.

In accordance with a second aspect of the invention, a system and method is provided for doing smart SSL handshake timeout detection to track and deny service to any SSL clients that do denial of service (DOS) attacks. The parameters to deny service to a client and to restore a client to service may be configurable, and include such considerations as the following:

1. IP addresses (company intranet or external Internet)
2. Handshake timeout period (how long the SSL server waits to timeout the handshake)
3. Numeric count threshold to trigger denial of service (how many timeouts before a client has its requests ignored)
4. Type of service (Telnet, FTP, HTTP, etc.)
5. IP ports (block all ports over 5000, for example)
6. Time of day (deny weekends or off hours)

Figure 2A:
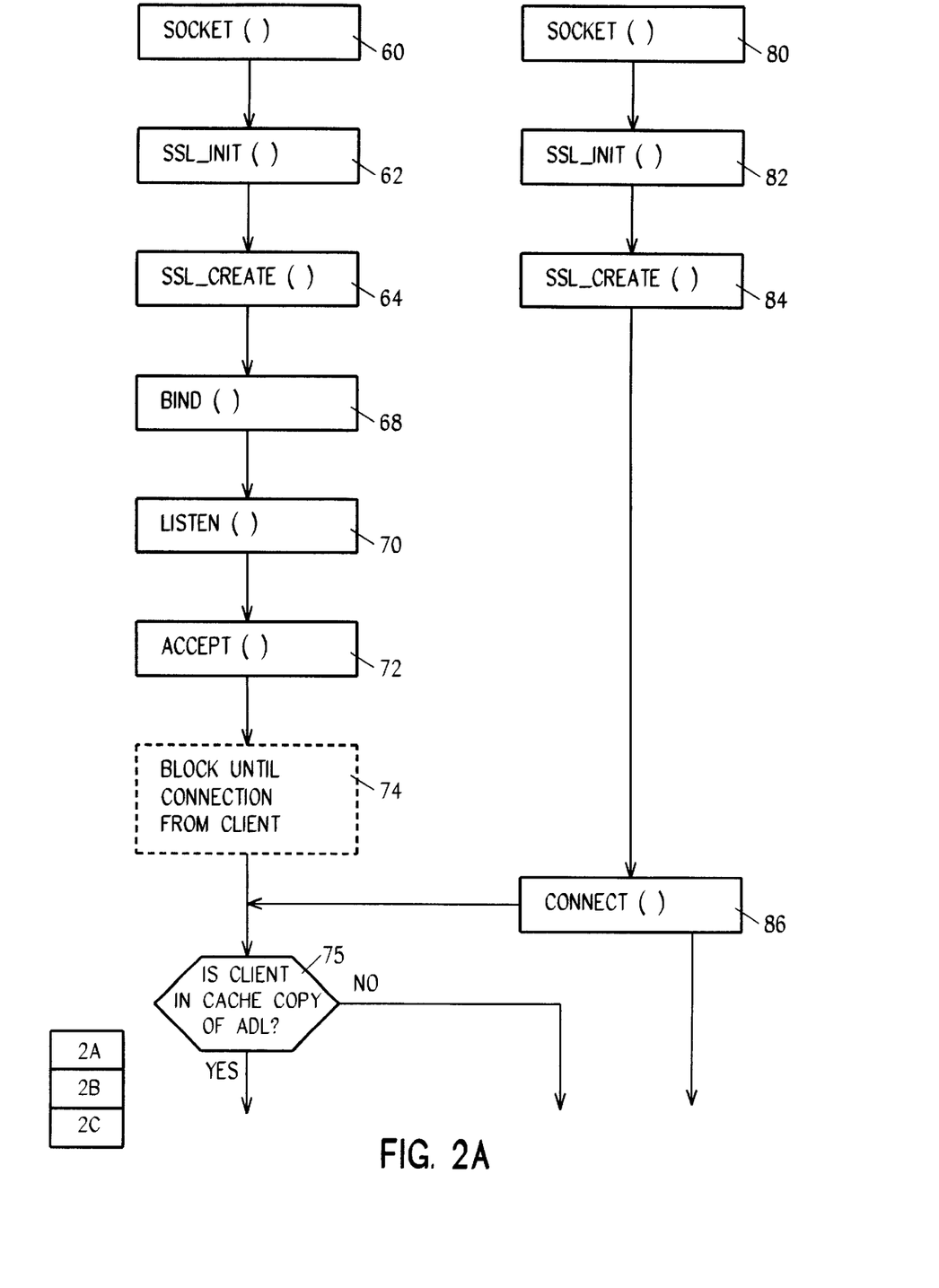
Figure 2B:
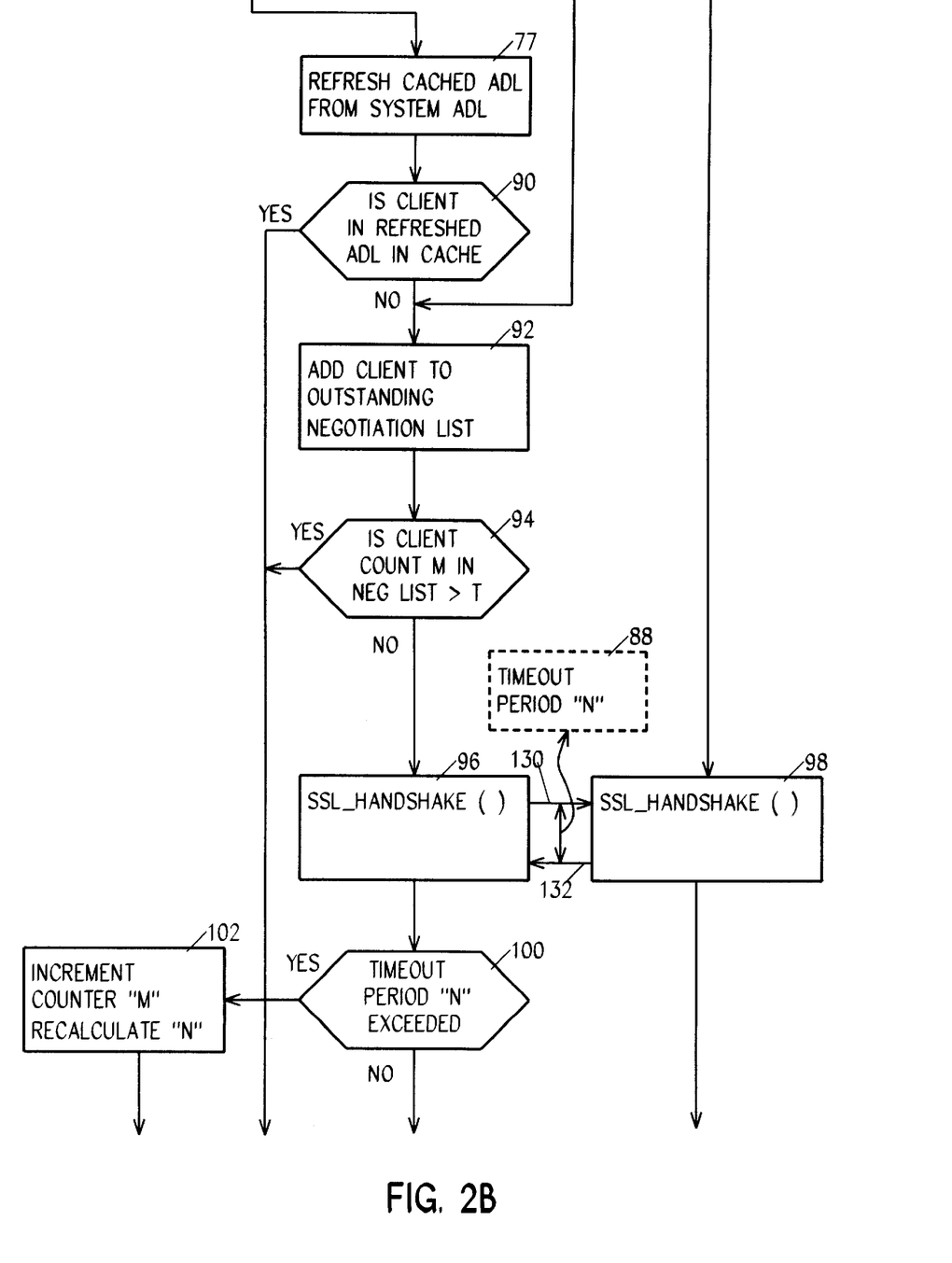
Figure 2C:
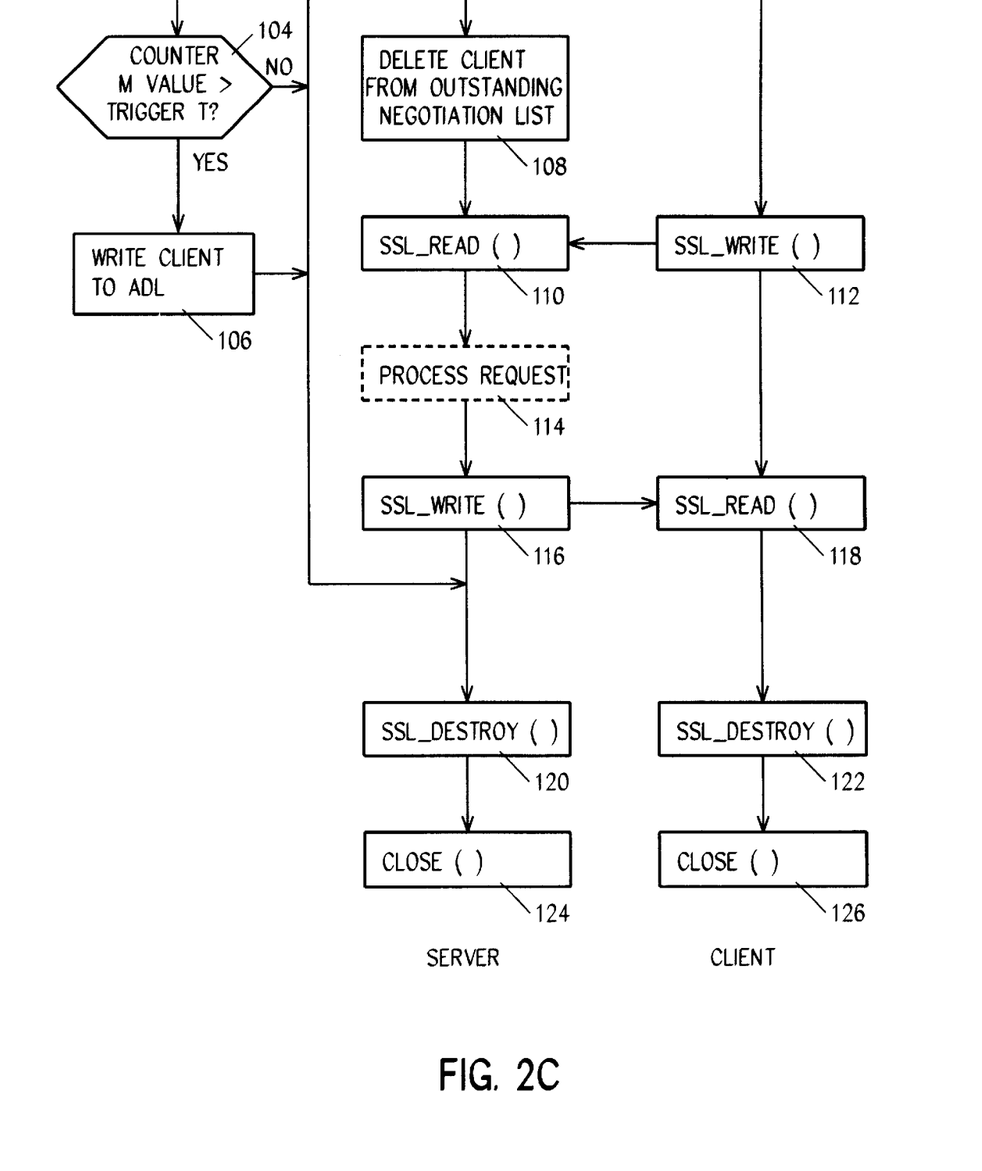

SSL handshake timeout setting 88 may be considered "smart" in that it is dynamically recalculated, using a weighting formula to account for network delays, for each client IP address that connects to the server. Thus, when any SSL client exceeds the smart timeout value, a counter is incremented to reflect this condition. When the tracking counter exceeds a trigger threshold, that client gets added to a denial of service, or access denied list (ADL). When any client is in the ADL, the SSL application server immediately closes any connection from that client and will not attempt to process it.

SSL application servers are written to maintain a common list of clients to be blocked (denied service). Server design can be done to accomplish this in many different ways, but whatever the design, the servers should all maintain a common storage or memory of clients denied service (that is, a server copy of the ADL).

Referring to FIG. 2, the flow of FIG. 1 is modified to implement the above described two aspects of the invention: outstanding negotiation list monitoring and denial of service based on smart timeout. In this description, the variable N represents the timeout period (also referred to as average RTT), variable M is a counter value representing the number of times N has been exceeded, and T is a trigger threshold for M (representing the value of M for which access is to be denied for a given client).

In this embodiment, in step 75 the SSL application server checks a cache copy of the ADL each time a client connects (step 86). If the client is found in the cache copy of the ADL, in step 77 a server copy of the ADL is accessed to refresh the cache copy, and again in step 90 the now refreshed cache copy of the ADL is checked to see if the client has been restored to service by action of the system administrator, or if the client is still to be denied service. If still to be denied service, in steps 120, 124 the connection is closed.

If in step step 90, no entry is found for this client in the ADL, in step 92 the client is added to an outstanding negotiation list, and in step 94, if the client appears more than T times (or a counter value M for that client has been incremented to a value greater than T), the request is denied (steps 120, 124). Otherwise, processing continues to step 96 to conduct the two-way handshake 130, 132 with an initial timeout value of "N". If timeout period "N" is not exceeded before completion 132 of the handshake, the relevant client entry is deleted (or its count value M is decremented) from the outstanding negotiation list and steps 110–118 executed to request and receive data. If the timeout value "N" 88 expires before the two-way handshake 130, 132 is complete, then in step 102 the server increments a counter M and in step 106 adds this client's IP address to the ADL file if the counter exceeds a trigger value T. The counter will not deny service to a client until it exceeds some configurable threshold or "trigger" value "T". At this time, the average round trip timeout period "N" is also recalculated in step 102 for this client's IP address in order to set a smart value "N" (aka, RTT) for clients that have more delay in their network paths.

An exemplary formula for this timeout calculation N determines for each client a round trip time (RTT) value using an adaptive sampling algorithm to weight the RTT. For example:

$$\text{Average Round Trip Time } (RTT) = (y * \text{Average\_RTT}) + ((1-y) * \text{New\_RTT})$$

where y is a value between 0 and 1.

Using this formula, picking a value for y very close to 1 effectively ignores the last RTT value (New_RTT), making the weighted average RTT value (Average_RTT) more significant. Letting y be almost 0 makes the weighted average change more quickly, making the last RTT value more significant. The value selected for y may be a configuration option for the server. If y is selected or configured at about y=0.9, then rapid changes in the RTT value may be prevented. Therefore, the timeout value can be set to equal double the RTT value, as follows:

$$\text{Timeout } "N" = 2 * RTT = 2 * ((y \text{Average\_RTT}) + ((1-y) * \text{New} + RTT))$$

Thus, the next time the client from this IP address connects, the server will set the handshake timeout value N based on the calculated timeout. N may be set at any value (2 as above, or more or less than 2) times RTT by the system administrator to allow for anticipated communication network delays.

In accordance with another embodiment of the invention, steps 75, 77 and 90 are modified so that a cache copy of the ADL is not kept for performance enhancements, and the system ADL is always accessed.

Once a client is added to the ADL, it is contemplated that a system administrator must remove the client once service is again to be granted. However, this may be automated— such as by purging the client entry in the ADL after some period of time since a last attempted connection (step 86).

ADVANTAGES OVER THE PRIOR ART

It is an advantage of the invention that there is provided an improved system and method for managing denial of service attacks.

It is a further advantage of the invention that there is provided a system and method for reducing the impact of a denial of service attack on server resources.

It is a further advantage of the invention that there is provided a system and method for managing denial of service attacks which does not unduly restrict service to legitimate clients.

It is a further advantage of the invention that there is provided a system and method for denying service to DOS hacker clients and maximizing service to legitimate clients.

It is a further advantage of the invention that there is provided a system and method for minimizing or eliminating server resources (CPU, storage, etc.) used by malicious clients.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for operating an application in the application layer of a server, comprising the steps of:

maintaining in said application layer of said server a record of the number of pending service requests from a client; and upon said application receiving a request for service from said client when said client has more than a configurable number of pending service requests denying service to said client.

2. The method of claim 1, further comprising the steps of:

determining when the number of times that negotiations for a service connection from said client exceed a timeout value; and upon said number exceeding a trigger threshold, denying service to said client.

3. The method of claim 2, further comprising the steps of:

processing a request at said server from said client to enter into secure sockets layer (SSL) negotiations;

responsive to failure of said negotiations to complete, registering a denial of service to a denial of service list; and responsive to registering a client to said denial of service list, closing any connection with said client while not processing any pending request from said client.

4. The method of claim 3, further comprising the steps of:

maintaining a cache copy and a server copy of said denial of service list;

selectively logging to said server copy clients restored to service by administrative action; and responsive to said request from said client for server resources, checking said cache copy to determine if service is to be denied to said client and, responsive to determining from said cache copy that service is to be denied, checking said server copy of said denial of service list to determine if said client is to be granted service.

5. The method of claim 4, further comprising the steps of:

responsive to determining from said cache copy of said denial of service list that said client is to be denied service, refreshing said cache copy from said server copy of said denial of service list, and re-checking said cache copy to determine if service is to be granted to said client.

6. The method of claim 2, further comprising the steps of:

responsive to a request for service from said client which is executed to completion within a timeout period, decrementing the number of outstanding connection requests from said client.

7. The method of claim 6, further comprising the step of:

responsive to a request for service from said client which is not executed to completion within said timeout period, incrementing the number of outstanding connection requests from said client.

8. The method of claim 7, further comprising the steps of:

further responsive to a request for service from said client which does not complete within said timeout period, recalculating said timeout period.

9. The method of claim 8, said recalculating step further comprising:

determining for said client an average round trip time value (RTT); and setting said timeout period as a function of said average round trip value.

10. The method of claim 9, further comprising the step of weighting said round trip value selectively to favor historical or more recent values of said round trip time.

11. A method for operating a server to manage denial of service attacks, comprising the steps of:

receiving from a client a connection request;

responsive to said connection request, determining if said client is identified for denial of service and, if so, closing said connection request;

responsive to said client not being identified for denial of service, incrementing a count M for said client in an outstanding negotiation list;

responsive to said count M being incremented to a value greater than a trigger value T, closing said connection request;

responsive to said count M being incremented to a value equal to or less than said trigger value T, entering into a service negotiation with said client;

responsive to said service negotiation successfully completing within a timeout period N, deleting said client from said outstanding negotiation list and processing said request for service;

responsive to said service negotiation not successfully completing within said timeout period N, incrementing said count M, recalculating said timeout period N and closing said connection request;

responsive to said count M exceeding a trigger value, identifying said client for denial of service.

12. A server system, comprising:

an application server;

an access denied list (ADL) of client addresses to be denied service by an application executing in said server;

a pending negotiation list for identifying clients negotiating server services with said application server;

a counter for maintaining a count M of the number of pending requests for services from a client in said pending negotiation list;

a trigger value T;

a timeout period value N;

said application server being responsive to a request for service from a client to be denied service for closing a secure sockets layer (SSL) connection request from said client;

said server being responsive to a request for service from a client not to be denied service for adding said request for service to said pending negotiation list; and said server being responsive to a SSL request from a client having more than T pending requests for service for closing said connection request from said client.

13. The system of claim 12, further comprising:

said server being responsive to a request for service from a client having T or less pending requests for service for entering into negotiations with said client.

14. The system of claim 13, further comprising:

said server being responsive to said negotiations exceeding said timeout period value N, for incrementing said count M, recalculating said timeout period value N, and closing said connection request from said client; and further responsive to said count M exceeding said trigger value T for identifying said client for denial of service.

15. The system of claim 12, said server further for negotiating a secure socket layer (SSL) connection with said client responsive to a SSL HELLO(SSL_INIT)request for service from said client that requires said client to respond.

16. A program storage device readable by a machine, tangibly embodying a program of instructions executable by a machine to perform method steps for operating an application in the application layer of a server, said method steps comprising:

maintaining in said application layer a record of the number of pending service requests from a client; and upon said application receiving a request for service from said client when said client has more than a configurable number of pending service requests denying service to said client.

17. The program storage device of claim 16, said method steps further comprising:

determining when the number of times that negotiations for a service connection from said client exceed a timeout value; and upon said number exceeding a trigger threshold, denying service to said client.

18. The program storage device of claim 17, said method steps further comprising:

registering a denial of service to a denial of service list;

responsive to registering a client to said denial of service list, closing any connection with said client while not processing any pending request from said client;

maintaining a cache copy and a server copy of said denial of service list, said server copy for keeping a master denial of service list for clients known to have too many requests for connection pending without responding and for selectively restoring access by administrator action, and said cache copy for tracking connection requests from a given client;

responsive to said request from said given client for server resources, checking said cache copy to determine if service is to be denied to said given client and, responsive to determining from said cache copy that service is to be denied, checking said server copy of said denial of service list to determine if said client is to be granted service;

responsive to determining from said cache copy of said denial of service list that said client is to be denied service, refreshing said cache copy from said server copy of said denial of service list, and re-checking said cache copy to determine if service is to be granted to said client;

responsive to a request for service from said client which completes within a timeout period, decrementing the number of outstanding connection requests from said client;

responsive to a request for service from said client which does not complete within said timeout period, incrementing the number of outstanding connection requests from said client;

further responsive to a request for service from said client which does not complete within said timeout period, recalculating said timeout period;

determining for said client an average round trip time value (RTT);

setting said timeout period as a function of said average round trip value; and weighting said round trip value selectively to favor historical or more recent values of said round trip time.

19. A computer program product or computer program element for executing method steps comprising:

receiving from a client a connection request;

responsive to said connection request, determining if said client is identified for denial of service and, if so, closing said connection request;

responsive to said client not being identified for denial of service, incrementing a count M for said client in an outstanding negotiation list;

responsive to said count M being incremented to a value greater than a trigger value T, closing said connection request;

responsive to said count M being incremented to a value equal to or less than said trigger value T, entering into a service negotiation with said client;

responsive to said service negotiation successfully completing within a timeout period N, deleting said client from said outstanding negotiation list and processing said request for service;

responsive to said service negotiation not successfully completing within said timeout period N, incrementing said count M, recalculating said timeout period N and closing said connection request;

responsive to said count M exceeding a trigger value, identifying said client for denial of service.

20. A method for operating a server, comprising the steps of:

maintaining a record of the number of pending service requests from a client;

upon receiving a request for service from said client when said client has more than a configurable number of pending service requests denying service to said client;

determining when the number of times that negotiations for a service connection from said client exceed a timeout value, and upon said number exceeding a trigger threshold, denying service to said client;

registering a denial of service to a denial of service list;

responsive to registering a client to said denial of service list, closing any connection with said client while not processing any pending request from said client;

maintaining a cache copy and a server copy of said denial of service list;

said server copy for keeping a master denial of service list of clients known to have too many requests for connection pending without responding and for selectively restoring access by administrator action;

said cache copy for tracking connection requests from a given client;

responsive to said request from said given client for server resources, checking said cache copy to determine if service is to be denied to said given client and, responsive to determining from said cache copy that service is to be denied, checking said server copy of said denial of service list to determine if said given client is to be granted service; and responsive to determining from said cache copy of said denial of service list that said client is to be denied service, refreshing said cache copy from said server copy of said denial of service list, and re-checking said cache copy to determine if service is to be granted to said client.

21. The method of claim 20, further comprising the steps of:

responsive to a request for service from said given client which is executed to completion within a timeout period, decrementing the number of outstanding connection requests from said given client.

22. The method of claim 21, further comprising the step of:

responsive to a request for service from said given client which is not executed to completion within said timeout period, incrementing the number of outstanding connection requests from said given client.

23. The method of claim 22, further comprising the steps of:

further responsive to a request for service from said given client which does not complete within said timeout period, recalculating said timeout period.

24. The method of claim 23, said recalculating step further comprising:

determining for said given client an average round trip time value (RTT); and setting said timeout period as a function of said average round trip value.

25. The method of claim 24, further comprising the step of weighting said round trip value selectively to favor historical or more recent values of said round trip time.

26. A program storage device readable by a machine, tangibly embodying a program of instructions executable by a machine to perform method steps for operating a server, said method steps comprising:

maintaining a record of the number of pending service requests from a client;

upon receiving a request for service from said client when said client has more than a configurable number of pending service requests denying service to said client;

determining when the number of times that negotiations for a service connection from said client exceed a timeout value, and upon said number exceeding a trigger threshold, denying service to said client;

registering a denial of service to a denial of service list;

responsive to registering a client to said denial of service list, closing any connection with said client while not processing any pending request from said client;

maintaining a cache copy and a server copy of said denial of service list, said server copy for keeping a master denial of service list for clients known to have too many requests for connection pending without responding and for selectively restoring access by administrator action, and said cache copy for tracking connection requests from a given client;

responsive to said request from said given client for server resources, checking said cache copy to determine if service is to be denied to said given client and, responsive to determining from said cache copy that service is to be denied, checking said server copy of said denial of service list to determine if said client is to be granted service;

responsive to determining from said cache copy of said denial of service list that said client is to be denied service, refreshing said cache copy from said server copy of said denial of service list, and re-checking said cache copy to determine if service is to be granted to said client;

responsive to a request for service from said client which completes within a timeout period, decrementing the number of outstanding connection requests from said client;

responsive to a request for service from said client which does not complete within said timeout period, incrementing the number of outstanding connection requests from said client;

further responsive to a request for service from said client which does not complete within said timeout period, recalculating said timeout period;

determining for said client an average round trip time value (RTT);

setting said timeout period as a function of said average round trip value; and weighting said round trip value selectively to favor historical or more recent values of said round trip time.

* * * * *